United States Patent
Clifford

[19]

[11] Patent Number: 5,813,394
[45] Date of Patent: *Sep. 29, 1998

[54] COOKING GRILL WITH MOISTURE-INSENSITIVE FLAME DETECTOR

[75] Inventor: Todd W. Clifford, Cincinnati, Ohio

[73] Assignee: Convenience Technologies, Inc., Cincinnati, Ohio

[ * ] Notice: The term of this patent shall not extend beyond the expiration date of Pat. No. 5,617,840.

[21] Appl. No.: 591,398

[22] Filed: Jan. 25, 1996

Related U.S. Application Data

[63] Continuation-in-part of Ser. No. 283,992, Aug. 1, 1994, Pat. No. 5,617,840, and a continuation-in-part of Ser. No. 856,347, Mar. 23, 1992, Pat. No. 5,333,596.

[51] Int. Cl.⁶ .............................. A47J 37/00; F24C 3/00
[52] U.S. Cl. .................. 126/41 R; 126/39 BA; 126/39 E; 431/25; 431/78
[58] Field of Search ............... 126/39 R, 39 BA, 126/39 N, 39 E, 39 G; 431/78, 25, 16, 11, 66, 71, 75, 77, 80

[56] References Cited

U.S. PATENT DOCUMENTS

| | | | |
|---|---|---|---|
| 3,289,801 | 12/1966 | Jerkins | 194/3 |
| 3,292,821 | 12/1966 | Cowley | 222/2 |
| 3,300,092 | 1/1967 | Williams | 222/70 |
| 3,630,189 | 12/1971 | Hodges et al. | 126/41 R |
| 3,964,463 | 6/1976 | Dailey | 126/41 R |
| 4,288,209 | 9/1981 | Yoshinaga | 431/255 |
| 4,805,587 | 2/1989 | Schweitzer | 126/39 L |
| 4,930,488 | 6/1990 | Pearman | 126/39 BA |
| 5,003,960 | 4/1991 | Hanagan | 126/39 BA |
| 5,033,449 | 7/1991 | Hanagan | 126/39 BA |
| 5,044,520 | 9/1991 | Moisan | 222/2 |
| 5,133,248 | 7/1992 | Farnsworth et al. | 126/41 R |
| 5,163,358 | 11/1992 | Hanagan et al. | 99/339 |
| 5,333,596 | 8/1994 | Clifford | 126/41 R |
| 5,472,337 | 12/1995 | Guerra | 431/25 |
| 5,617,840 | 4/1997 | Clifford | 126/39 BA |

FOREIGN PATENT DOCUMENTS

| | | | |
|---|---|---|---|
| 68731 | 6/1981 | Japan | 126/39 BA |
| 174627 | 10/1982 | Japan | 126/39 BA |
| 213740 | 10/1985 | Japan . | |
| 2 099 607 | 12/1982 | United Kingdom . | |
| 2 109 603 | 6/1983 | United Kingdom . | |

*Primary Examiner*—James C. Yeung
*Attorney, Agent, or Firm*—Standley & Gilcrest

[57] ABSTRACT

The cooking grill has a moisture-insensitive flame detector capable of accurately determining the presence or absence of flame in the presence of moisture disposed adjacent to the burner. It also provides a more reliable ignition device and will relight the grill if the flame is blown out. The cooking grill also has an automatic shut-off to protect against the user forgetting to turn off the gas. It provides a lock-out system which prevents unauthorized use by individuals, such as children. Finally, the temperature in a grill or other cooking device can be controlled by cycling the burner on and off through microprocessor commands.

20 Claims, 7 Drawing Sheets

COOKING GRILL WITH MOISTURE-INSENSITIVE FLAME DETECTOR

This is a continuation-in-part of U.S. patent application Ser. No. 08/283,992 filed Aug. 1, 1994, U.S. Pat. No. 5,617,840 entitled OUTDOOR COOKING GRILL PROVIDED WITH VENDING APPARATUS said application being a continuation-in-part of U.S. patent application Ser. No. 07/856,347 filed Mar. 23, 1992 (now issued U.S. Pat. No. 5,333,596 issued Aug. 2, 1994). This continuation-in-part claims the priority benefit of U.S. Ser. No. 08/283,992 under 35 U.S.C. Section 120.

BACKGROUND AND SUMMARY OF THE INVENTION

This invention relates to cooking grills, and more particularly to those provided with, or connected to, a source of cooking fuel or electricity.

Fuel-connected outdoor grills typically include a cooking chamber defined by a relatively deep base and cover portions, one or more food positioning racks disposed between the base and the cover, and a source of cooking fuel. The fuel for the grills is typically natural gas from a metered house supply or propane gas or the like from a portable refillable storage tank.

Fuel connected outdoor grills typically incorporate a piezo igniter that creates a spark through mechanical action to ignite the gas at the burner. The spark electrode must have proper positioning in relation to the burner and must remain free of grease and food particles to be effective. As a result, piezo igniters are not consistently reliable.

In addition, conventional flame detectors used with outdoor grills do not work accurately in the presence of moisture. Conventional flame detection technology measures the conductance between a pair of spaced apart electrodes. When a flame is not present impedance is high, resulting in no conductance between the electrodes: When a flame is present, impedance is lowered, permitting conductance between the electrodes. However, when moisture is present, the water permits conductance between the two electrodes, the grill housing and the electrodes and falsely reports flame detection.

Controlling the temperature of grills present another problem. Conventionally, the cooking temperature is controlled by varying the amount of gas flowing to the burner. The problem with this method is that the burner is easily extinguished at low temperatures (low flow rate). If the wind extinguishes the flame, unignited fuel will continue to flow to the burner.

A conventional cooking oven controls cooking temperature by cycling the burner based on input from a temperature sensing device inside the cooking cavity which feeds data back to the electronic control. However, this requires a temperature sensing device, associated assembly and inventory costs, and part failure and warranty costs. It would be desirable to eliminate these costs and still be able to maintain accurate temperature control.

Another drawback of the typical gas grill is that the user must remember to shut off the flow of fuel when finished. Users often forget, resulting in unsafe operating conditions and fires. An additional problem with conventional gas grills is that there is no way to restrict access to turning the gas on, particularly by small children. Another drawback of gas grills has been the relative inability to know the exact fuel level in the tank at any given time. Without knowing the fuel level a user could start preparing a meal on the grill and not be able to finish cooking if the tank runs out of fuel.

BRIEF DESCRIPTION OF THE DRAWINGS

FIGS. 4 A–C show a flow chart illustrating the logic sequence of a preferred embodiment of the control program for the present invention.

DESCRIPTION OF THE INVENTION

The present invention is a cooking grill with a food-positioning rack, a burner disposed below the rack for distributing a flame, a conduit for conveying a cooking fuel to the burner, a source of cooking fuel connected to the conduit, a moisture-insensitive flame detector capable of accurately determining the presence or absence of flame in the presence of moisture disposed adjacent to the burner, a control circuit electrically connected to the flame detector, and connective means for electrically connecting the control circuit to a source of electricity.

The cooking grill has an electrically actuated fuel shut-off valve interposed on the conduit between the source of fuel and the burner and connected to the control circuit. The control circuit can close the shut-off valve after a selected period of time.

The flame detector preferably has a flame sensor and a hot surface igniter. The control circuit, in response to a signal from the flame sensor, can switch on the hot surface igniter and open the shut-off valve, and switch the hot surface flame igniter off after a predetermined period of time and close the shut-off valve so as to verify moisture removal from the flame sensor.

In addition, the control circuit can switch the hot surface igniter off in response to a signal from the flame sensor and close the shut-off valve after a selected period of time in the absence of the signal from the flame sensor.

The cooking grill can also have a regulator in association with the shut-off valve for maintaining a substantially constant fuel flow rate, to provide a known fuel level over time to the burner. The control circuit monitors the time the valve has been open.

The cooking grill can also have an input device connected to the control circuit. The shut-off valve can be locked or unlocked in response to an input to the input device. The input device is preferably a touch keypad. The cooking grill may also have an output device, such as an audio device or a display device.

The control circuit of the cooking grill can periodically open and close the shut-off valve in response to a predetermined pattern so that an average temperature in the grill is maintained. The predetermined pattern may be stored on a microprocessor.

The source of electricity is preferably a battery charged by a solar panel.

Alternatively, the cooking grill can have a food positioning surface, a conduit for conveying heat to the surface, a coupling connecting the conduit to a source of energy for creating heat, a control circuit electrically connected to the source of energy which periodically opens and closes the coupling in response to a predetermined pattern so that an average temperature in the grill is maintained. The predetermined pattern can be stored on a microprocessor.

The invention provides a functional flame ignition and detection system in the presence of moisture. It also provides a more reliable ignition device and will relight the grill if the flame is blown out. The invention provides an automatic shut-off to protect against the user forgetting to turn off the gas. It provides a lock-out system which prevents unauthorized use by individuals, such as children. Finally, it controls the temperature in a grill or other cooking device by cycling the burner on and off through microprocessor commands.

Figure 1:
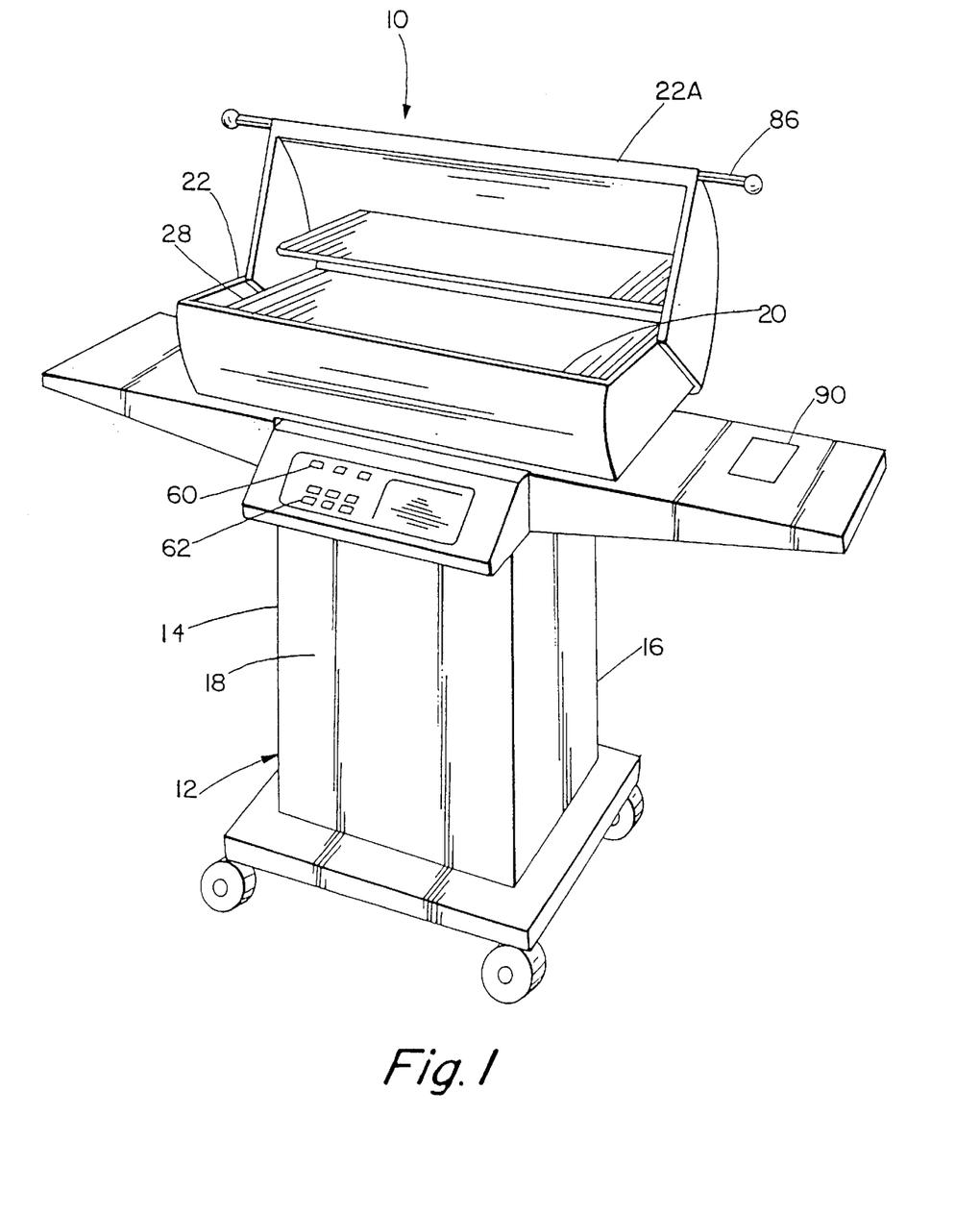
FIG. 1 is a perspective view of a preferred embodiment of an outdoor grill according to the present invention.

As illustrated in FIG. 1, an outdoor grill, generally designated 10, according to a preferred embodiment of the present invention is provided with a housing 12 having laterally spaced apart side walls 14, 16, a front wall 18 rigidly connected to the side walls, a base equipped with casters or wheels and a generally cylindrical cooking cavity 22. The cooking cavity includes a roll top lid 22A hingedly connected to the side walls of the cooking cavity wall 18 and two shelves extending from the side walls.

Figure 3:
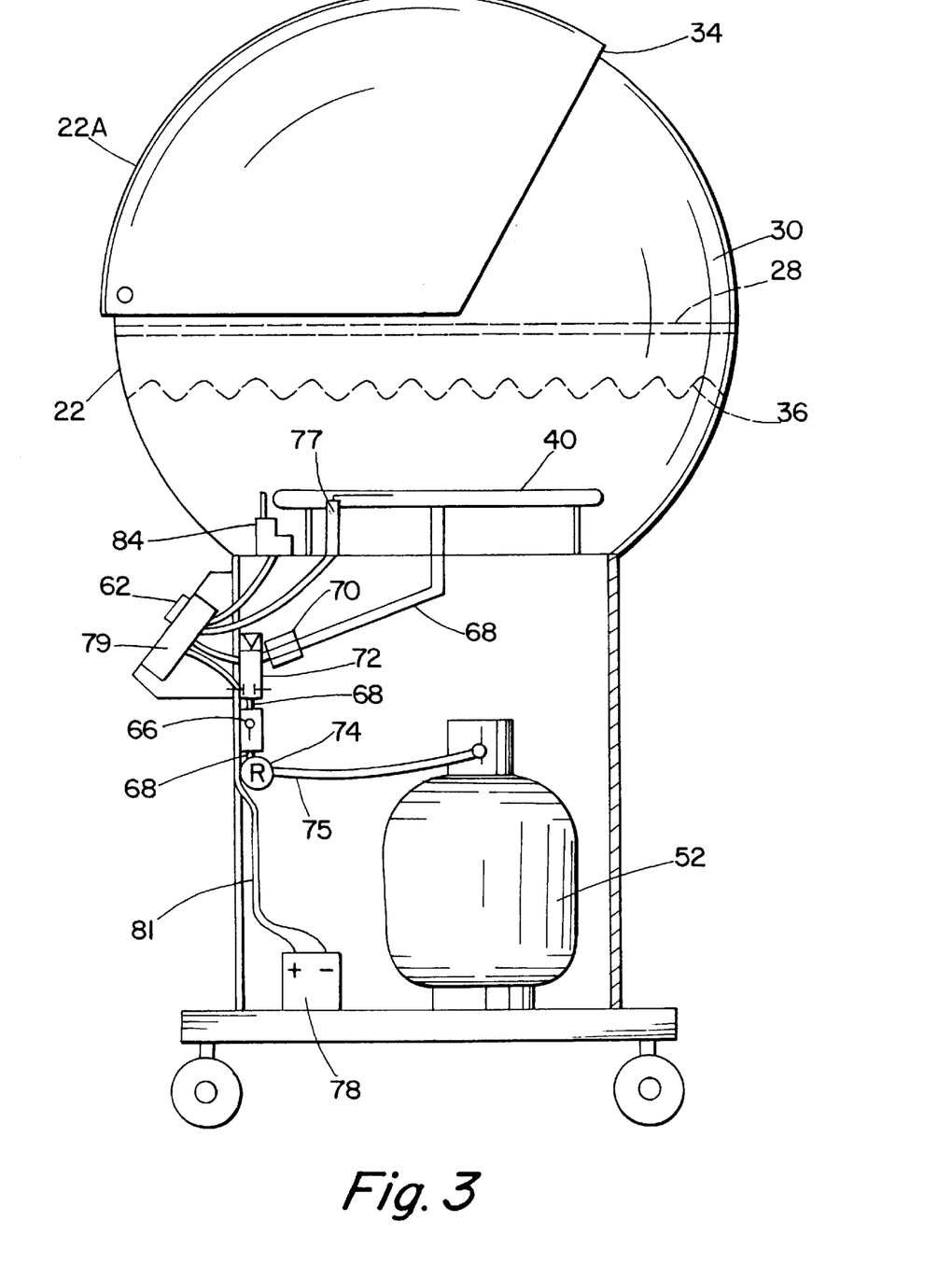
FIG. 3 is a vertical sectional view of the grill illustrated in FIG. 1.

Advantageously, the side walls 14, 16, and front wall are formed from one sheet of steel, although it would also be possible to fasten the individual side walls together. Extending horizontally within the cooking cylinder at the level of the upper edge of the front wall 20 is a food-receiving rack 28. Alternatively, the rack 28 may be fastened to the housing 12 so as to be vertically adjustable therein. In any event, the rack 28 can be securely mounted in the housing 12 so that it serves as a barrier which protects the lower components. As illustrated in FIG. 3, cooking chamber 30 is defined when the lid 22A is closed and access to the food-positioning rack 28 is facilitated when the lid is rolled open. Air flow through the cooking chamber 30 is preferably provided by vent 34 in the top of the cooking cavity.

As illustrated in FIG. 3, the cooking chamber 30 is also preferably provided with a horizontally disposed grate 36 mounted below the food-receiving rack 28. The grate can be welded at perimeter edge portions thereof to adjoining portions of the front, side and rear walls, or it may be fastened to the cooking chamber 30 so as to be vertically adjustable therein. The grate is heated directly by a burner 40 disposed therebelow and to diffuse and radiate heat over a relatively large portion of the food-receiving rack 28.

A manual flow control valve can be mounted in the fuel conduit to control flow of fuel to the burner.

Figure 2:
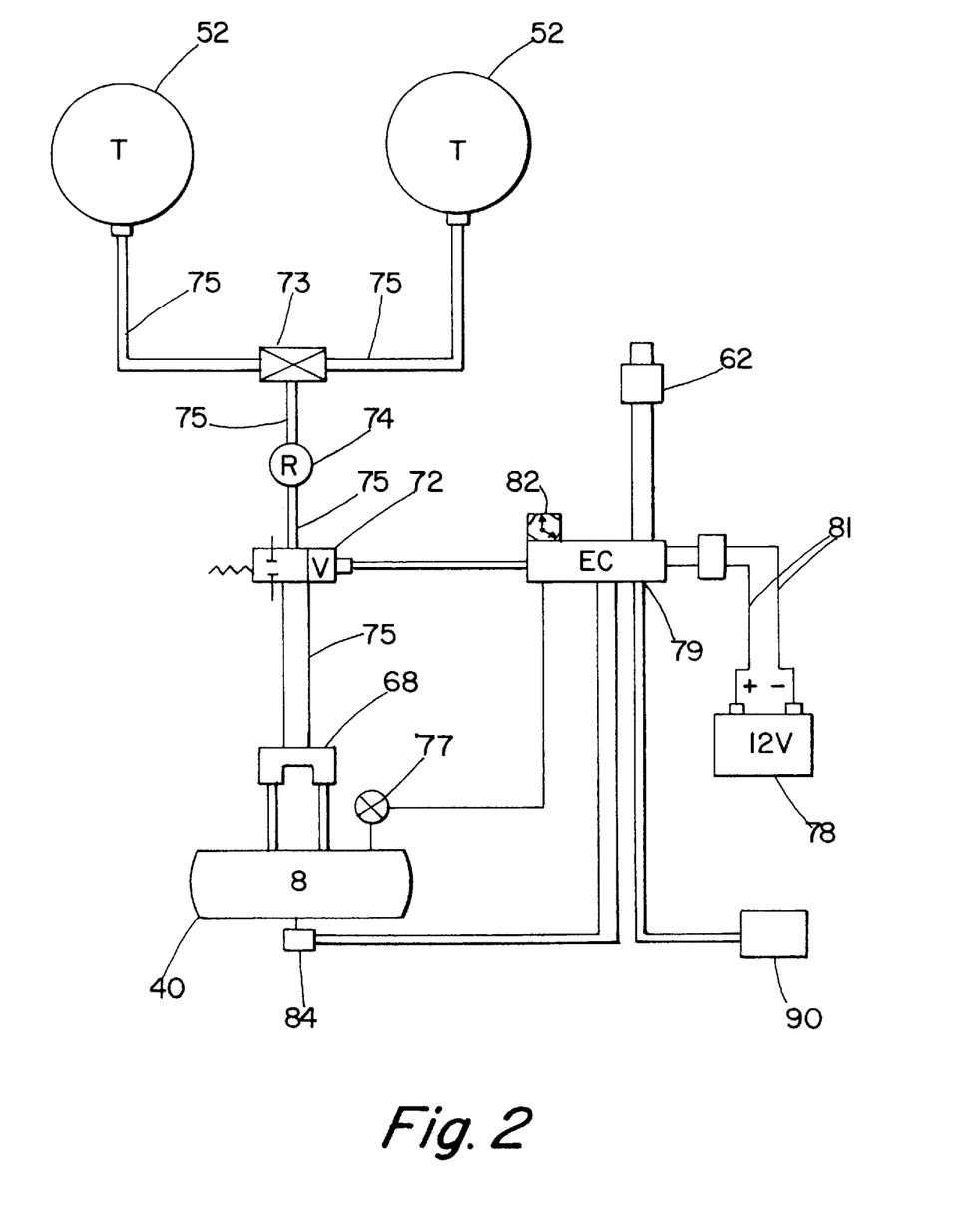
FIG. 2 is a diagrammatic view of the operative components of preferred embodiment of the cooking grill of the present invention.

An aperture 70 is provided in the gas supply pipe 68 to permit the admixture of air with the cooking gas. If desired, a control assembly (not shown) may be provided to vary the size of the air inlet 70.

As illustrated diagrammatically in FIG. 2, the gas supply pipe 68 is connected to a solenoid-actuated valve 72 via a conduit 75. A conventional flow regulator 74 is interposed between the valve 73 and the solenoid-actuated valve 72. The solenoid-actuated valve 72 is electrically connected to a control circuit 79 which houses a hard-coded program and a timer for controlling the ignition, flow of gas, safety features and visual display, as described in some detail below.

A 12-volt battery 78 is connected, via conductor 81 to the control circuit 79. The battery 78 may be assisted by or replaced by a solar cell 90. A 120V or 220V power supply 92, for example, may replace the battery 78.

The hard-coded program of the control circuit 79 is preferably electrically connected to the input/output device 62, a flame detector 77 mounted adjacent to the burner 40, a timer or integral clock 82 on the control circuit 79 and the battery 78 via the conductor 81. The control circuit 79 is also equipped with conventional switching mechanisms for controlling the flow of current from the battery 78 to the solenoid-actuated valve 72 and to a hot surface igniter 84 adjacent to the burner 40 in response to signals from the hard-coded program. In addition, the control circuit 79 is connected to the digital display 60.

The input/output device 62 can be any conventional input device such as buttons or a touch keypad. If desired, the input device can be combined with any conventional output device, such as a visual display, an audible alarm, or a flashing light.

Figure 4A:
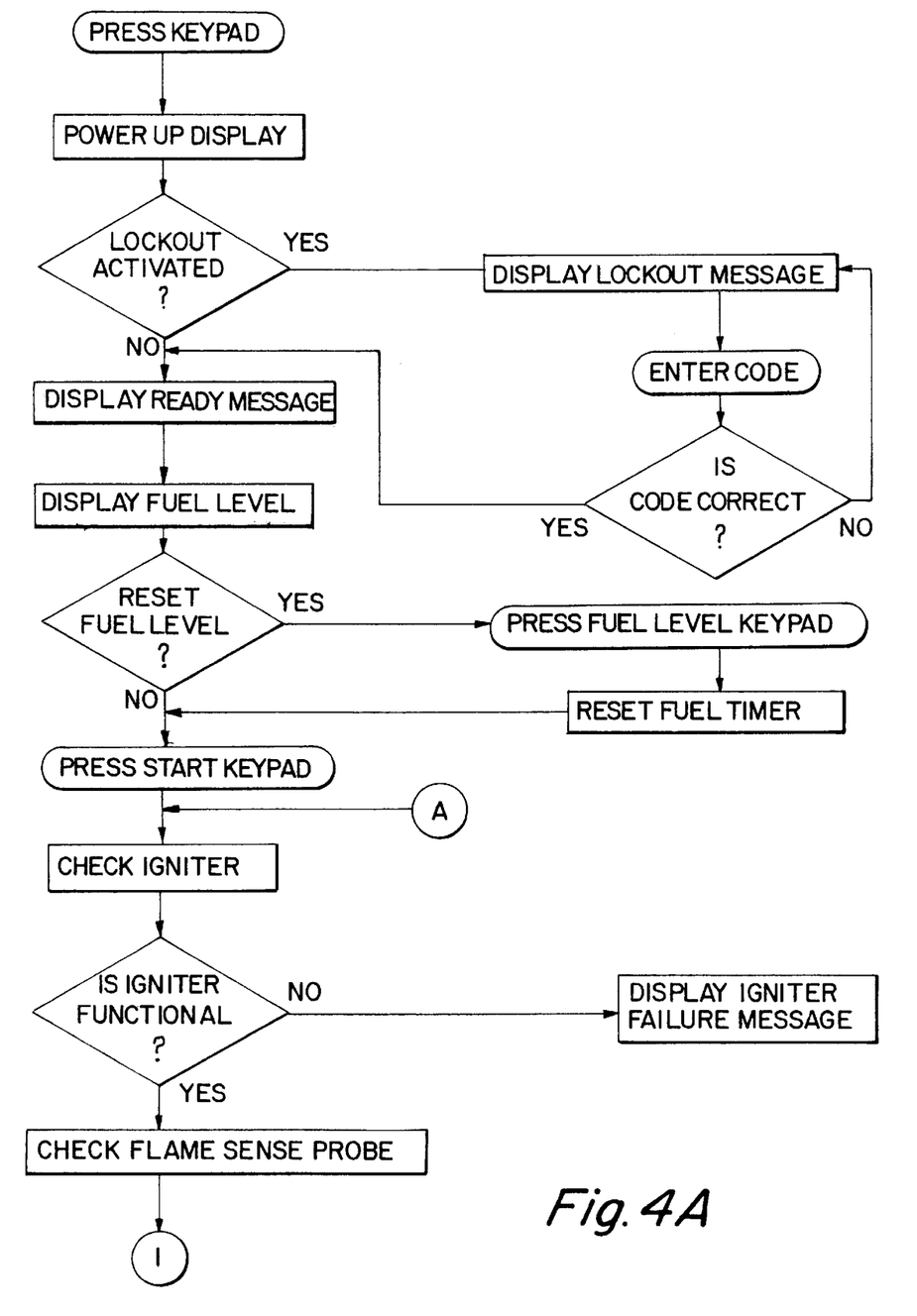
Figure 4B:
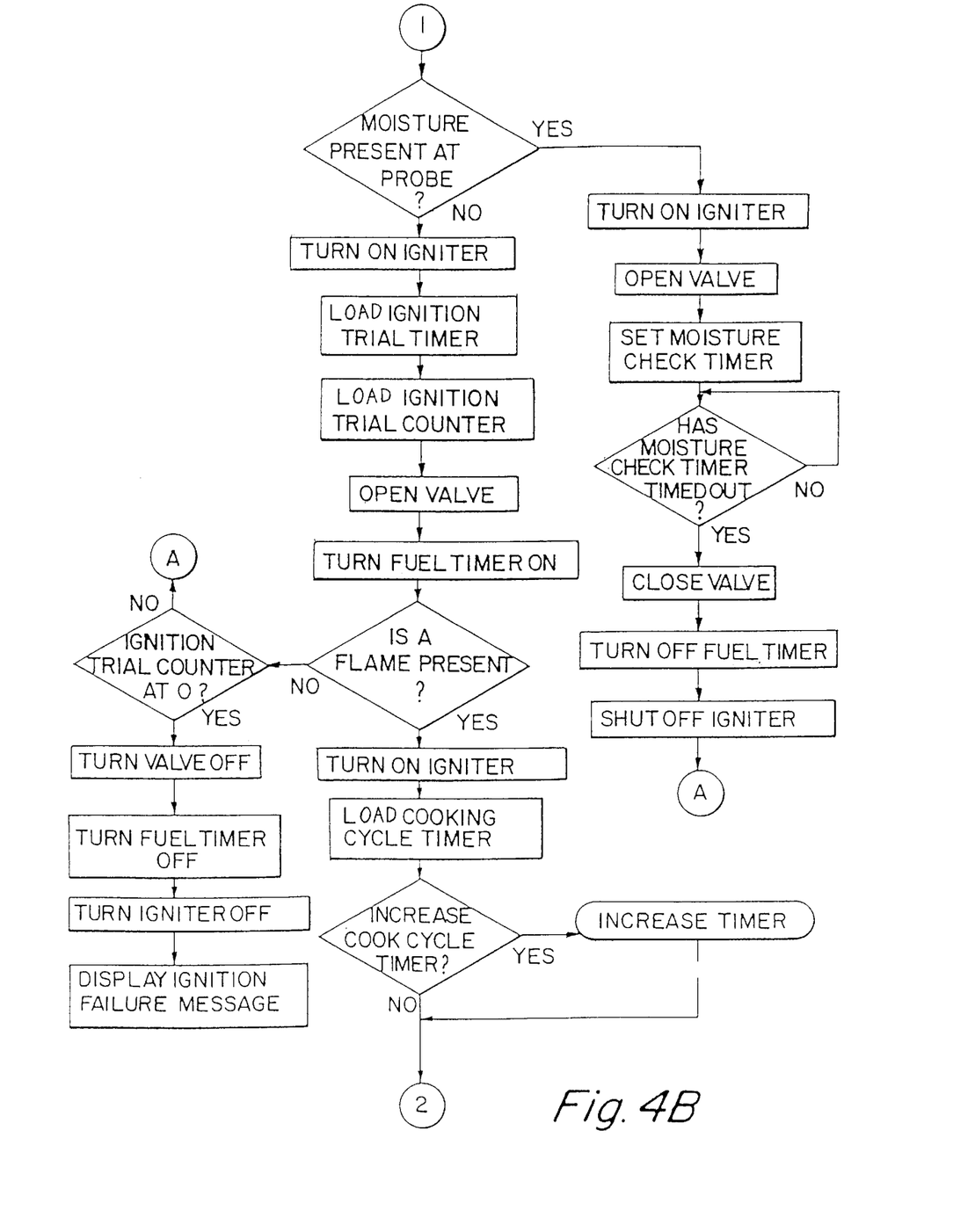
Figure 4C:
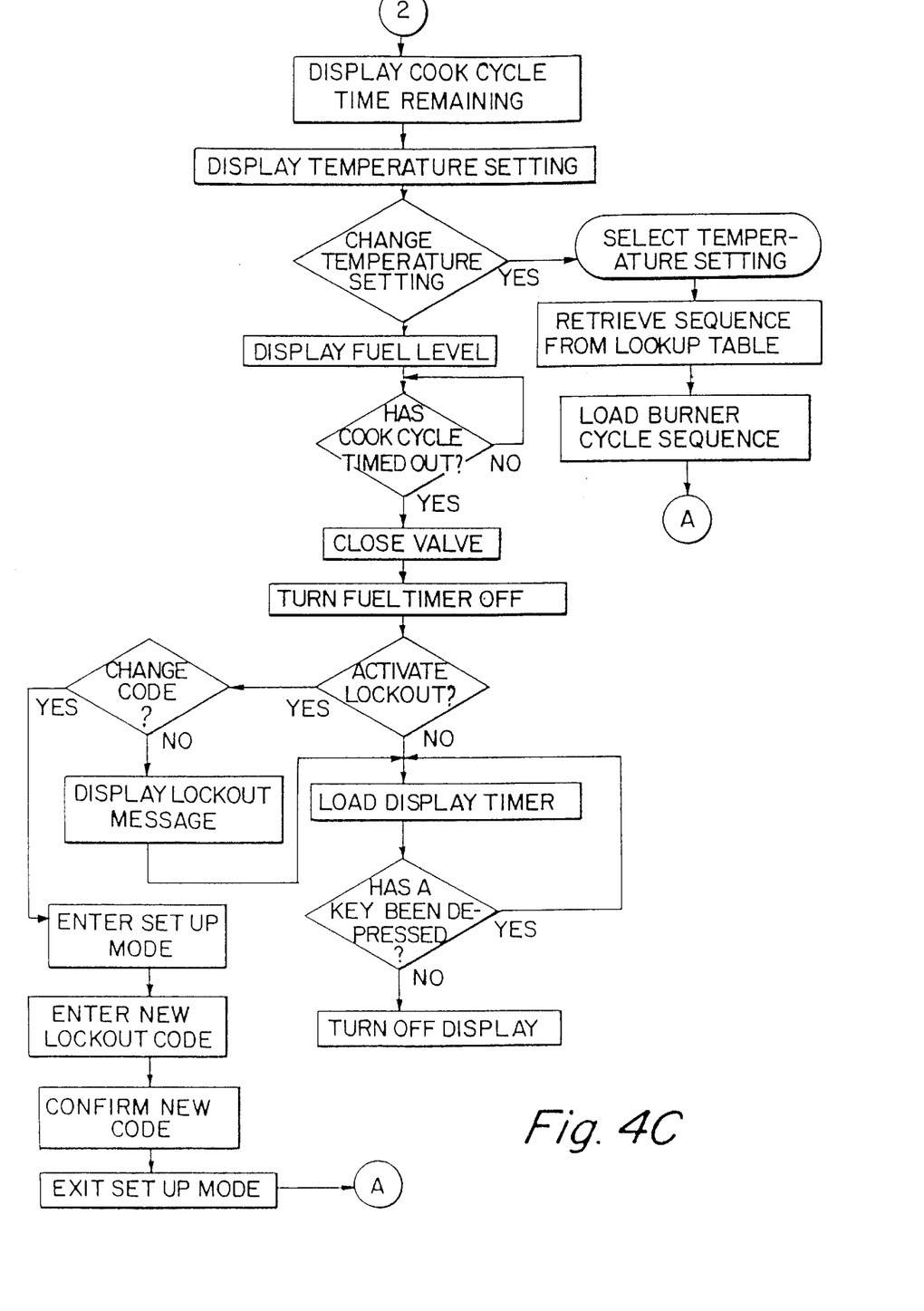

The control program for the present cooking grill 10 operates in the preferred manner illustrated in flow chart 4A–4C. The user lifts the lid 22 by a handle 86 and either places the food to be cooked on the rack 28 or waits to do so until the cooking chamber 30 has reached a suitable temperature. The user then enters a code on the input/output device 62, whereupon the input/output device 62 provides a signal to the control circuit 79 which, in turn, displays a system ready notice on the input/output device 62 if the proper code was entered. If an improper code was entered, the system preferably displays a lock-out message.

If the system ready notice appears, the control circuit 79 will perform an igniter proving check on the hot surface igniter 84 to ensure that it is operational. The hot surface igniter 84 is made of silicone carbide and uses electrical resistance to preferably create a 2000° F. element to ignite the fuel. The control circuit 79 then verifies the electrical resistance of the hot surface igniter 84. If no electrical resistance is detected, the hot surface igniter 84 is either malfunctioning or not properly connected. The control circuit 79 will report an error message on the input/output device 62 and become inoperable.

Once the control circuit 79 verifies the hot surface igniter 84 is functional, the control circuit 79 checks the flame sensor 77 for conductance to see if moisture is present. If no moisture is present, the control runs through its regular program routine. If the control circuit detects moisture, an alternate program routine is loaded.

If the control circuit detects moisture, the control circuit 79 will turn on the hot surface igniter 84 and open the solenoid-actuated valve 72 to allow fuel to flow to the burner 40. By using the hot surface igniter 84 in combination with the igniter proving check by the control circuit 79, the gas is reliably ignited when it reaches the 2000° F. hot surface igniter 84. The flame sensor 77 has a coated ceramic housing which is placed directly in the flame to provide quick evaporation of any water bridging the flame sensor 77 and grill housing. Once the gas is ignited, it vaporizes the thin film of water on the flame sensor's ceramic housing, thus eliminating the conductance and false flame signal from the flame sensor 77. If there is no false signal, the control circuit 79 goes back to normal operation. If a false signal is detected, the control circuit 79 repeats the alternate program routine until the flame sensor 77 is dry, thus ensuring reliable ignition and flame detection in an outdoor to wet environment.

In the regular program routine, the control circuit 79 signals the solenoid-actuated valve 72 to open, and gas flows to the burner 40. Shortly thereafter, the control circuit 79 activates the hot surface igniter 84. If the flame detector 77 is activated by a flame on the burner 40, a signal is sent to the control circuit 79 to turn off the igniter 84. If no flame is detected, the igniter and solenoid-actuated valve 72 remain open for a selected period of time, whereupon a "no gas" or "no ignition" message is presented on the input/output device 62, the solenoid-actuated valve 72 is closed, and the igniter 84 is shut off. As may be readily understood, the foregoing portion of the program prevents unignited gas from continuing to flow from the tank 52 in the event that the igniter 84 fails to create a flame at the burner 40 within a selected period of time.

If a flame is created at the burner 40, the flame detector 77 signals the control circuit 79 to that effect, and the control circuit turns the igniter 84 off. The solenoid-actuated valve 72 remains open, and gas continues to flow to the burner for a selected period of time which may be set by entry on the input/output device 62. During the time in which a flame is present at the burner, the user can control the temperature in the cooking chamber 30 by inputting the desired setting on the input/output device. The manual valve 66 is mounted in the gas pipe 68 so that the operator may, by manipulating the control lever effectively, manually restrict the flow of gas. While the gas is flowing and a flame is present, the user places food on the rack 28 and can close the lid 22, if desired, without extinguishing the flame. The amount of time remaining in a given cooking cycle is displayed periodically or continuously so that the user is able to gauge whether the food is properly cooked before additional time is added. Once the cooking cycle has timed out, the control circuit 79 closes the solenoid actuated shut-off valve 72.

Another preferred method of operation of the grills of the present invention is to electronically control fuel flow and cooking temperature by having the user press a high, medium, or low key, for example, on a keypad or enter a set temperature. The control circuit 79, will preferably initiate a cycle of terminating gas flow to the burner by turning off the solenoid actuated shut-off valve 72 for a preset time interval and then restoring gas flow to the burner by opening the solenoid actuated shut-off valve 72 and turning on the hot surface igniter 84 to re-ignite the gas, or by adjusting the electrical current to an electric cooking grid. The control circuit 79 will continue this sequence until a preset time is expired. Because the flow rate of the gas to the burner is not reduced, the burner is less susceptible to being extinguished by the wind.

Figure 5:
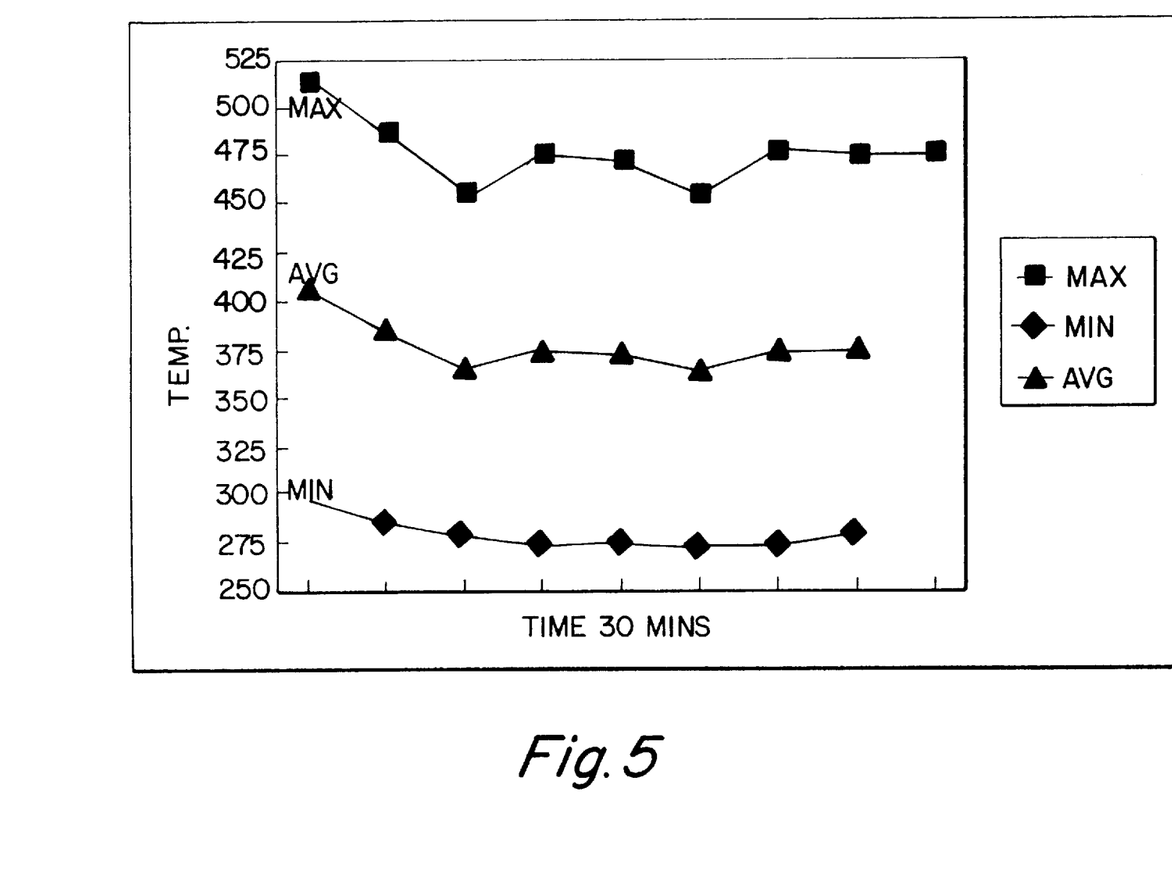
FIG. 5 is a chart showing an example temperature achieved by a grill with a specified on-off cycling of the burner.

The proper cycling sequence for different temperatures is obtained by recording various on/off time sequences and the resultant temperatures achieved. The results of a typical test are shown in FIG. 5. In FIG. 5, the burner was initially turned on for a three minute period to bring the grill up to temperature. At that point the burner was cycled on for one minute, and off for 1 minute, 45 seconds. As FIG. 5 shows this will yield an average temperature of 375° F. Similar cycling times can be obtained for a proper cycling sequence for other temperatures. This information is then stored on a microprocessor used in the control circuit. When a user desires a certain grill operating temperature, the microprocessor recalls from memory the proper cycling sequence for the desired temperature and causes the burner to cycle on and off accordingly.

Another primary objective of the present invention is to warn the user of a tank fueled grill when insufficient fuel remains for cooking a food completely. This is accomplished by having the control circuit 79 calculate a minimum acceptable fuel level. When the minimum acceptable fuel level is reached, the control circuit 79 and its operating program will automatically display a message that the grill is low on fuel.

The minimum acceptable fuel level is calculated by integrating a standardized gas storage tank with a known volume of gas, holding the gas flow rate and gas pressure constant by use of the regulator 74 to provide a known fuel level or capacity in units of time. The control circuit 79 then calculates when the grill reaches the preset minimum acceptable fuel level by subtracting the cumulative time of operation of the electrically operated valve from the known tank fuel level or capacity in units of time by using a microprocessor in the control circuit 79. The control circuit must be reset each time the tank is replenished.

It is to be understood that the invention is not limited in its application to the details of construction and the arrangement of components set forth in the following description or illustrated in the drawings. The invention is capable of other embodiments and of being practiced or carried out in various ways. Also, it should be understood that the phraseology and terminology used herein is for the purpose of description and should not be regarded as limiting.

What is claimed is:

1. A cooking grill which comprises:
 a food-positioning rack;
 a burner disposed below the rack for distributing a flame;
 a conduit for conveying a cooking fuel to the burner;
 a source of cooking fuel connected to the conduit;
 a control circuit;
 an electrically actuated fuel shut-off valve interposed on the conduit between the source of fuel and the burner and electrically connected to the control circuit;
 connective means for electrically connecting the control circuit to a source of electricity; and
 a flame detector electrically connected to the control circuit, the flame detector having a flame sensor and a hot surface igniter, the flame detector adapted to determine the presence or absence of flame in the presence of moisture disposed adjacent to the burner;
 wherein the control circuit, in response to a false signal from the flame sensor, switches on the hot surface igniter and opens the shut-off valve, then switches the hot surface igniter off after a predetermined period of time and closes the shut-off valve, so as to remove moisture from the flame sensor.

2. The cooking grill of claim 1 wherein the control circuit closes the shut-off valve after a selected period of time.

3. The cooking grill of claim 1 wherein the control circuit switches the hot surface igniter off in response to a signal from the flame sensor and closes the shut-off valve after a selected period of time in the absence of a signal from the flame sensor.

4. The cooking grill of claim 1 further comprising a regulator in association with the shut-off valve for maintaining a substantially constant fuel flow rate, to provide a known amount of fuel over time to the burner, and wherein the cooking fuel is of a known quantity and the control circuit monitors the time the valve has been open.

5. The cooking grill of claim 1 further comprising an input device connected to the control circuit.

6. The cooking grill of claim 5 wherein the shut-off valve is locked or unlocked in response to an input to the input device.

7. The cooking grill of claim 5 wherein the input device is a touch keypad.

8. The cooking grill of claim 1 further comprising an output device.

9. The cooking grill of claim 1 wherein the control circuit periodically opens and closes the shut-off valve in response to a predetermined pattern so that an average temperature in the grill is maintained.

10. The cooking grill of claim 9 wherein the predetermined pattern is stored on a microprocessor.

11. The cooking grill of claim 1 wherein the source of electricity is a solar panel.

12. A cooking grill which comprises:

a food-positioning rack;

a burner disposed below the rack for distributing a flame;

a conduit for conveying a cooking fuel to the burner;

a source of cooking fuel connected to the conduit;

a flame detector having a flame sensor and a hot surface igniter, the flame detector adapted to determine the presence or absence of flame in the presence of moisture disposed adjacent to the burner;

a control circuit electrically connected to the flame detector; and connective means for electrically connecting the control circuit to a source of electricity;

wherein the control circuit, in response to a false signal from the flame sensor, switches on the hot surface igniter and allows fuel to flow to the burner, then switches the hot surface igniter off after a predetermined period of time and stops fuel from flowing to the burner, so as to remove moisture from the flame sensor.

13. A cooking grill comprising:

a food-positioning rack;

a burner disposed below the rack for distributing a flame;

a conduit for conveying a cooking fuel to the burner;

a source of cooking fuel connected to the conduit;

a control circuit:

an electrically actuated fuel shut-off valve interposed on the conduit between the source of fuel and the burner and electrically connected to the control circuit; and wherein the control circuit substantially maintains an average predetermined cooking temperature without the aid of a temperature sensor by periodically opening and closing the shut-off valve in a predetermined pattern.

14. The cooking grill of claim 13 wherein the predetermined pattern is stored on a microprocessor.

15. A cooking grill which comprises:

a food-positioning rack;

a burner disposed below the rack for distributing a flame;

a conduit for conveying a cooking fuel to the burner;

a source of cooking fuel connected to the conduit;

a control circuit;

an electrically actuated fuel shut-off valve interposed on the conduit between the source of fuel and the burner and electrically connected to the control circuit;

a regulator in association with the shut-off valve for maintaining a substantially constant fuel flow rate such that a known amount of fuel is provided over time to the burner; and connective means for electrically connecting the control circuit to a source of electricity;

wherein the cooking fuel is of a known quantity and the control circuit monitors the time the valve has been open.

16. A method for substantially maintaining an average predetermined cooking temperature without the aid of a temperature sensor, the method comprising:

providing a cooking appliance having a burner, a conduit for conveying a cooking fuel to the burner, a source of cooking fuel connected to the conduit, an electrically actuated fuel shut-off valve interposed on the conduit between the source of fuel and the burner, and a control circuit electrically connected to the electrically actuated fuel shut-off valve;

programming the control circuit with a program to periodically open and close the electrically actuated fuel shut-off valve in a predetermined pattern such that the average predetermined cooking temperature is substantially maintained; and opening and closing the electrically actuated fuel shut-off valve in response to the program of the control circuit.

17. The method of claim 16 wherein the cooking appliance is a cooking grill.

18. The method of claim 16 wherein the control circuit includes a microprocessor adapted to store the program.

19. The method of claim 16 wherein the cooking fuel is natural gas.

20. The method of claim 16 wherein the cooking fuel is propane.

* * * * *